3,005,026
N-SUBSTITUTED-2,6-XYLIDINES

David A. Gordon, Midland, Mich., assignor to The Dow Chemical Company, Midland, Mich., a corporation of Delaware
No Drawing. Filed July 17, 1958, Ser. No. 749,053
5 Claims. (Cl. 260—577)

This invention relates to N-substituted 2,6-xylidines and is directed to compounds corresponding to the formula

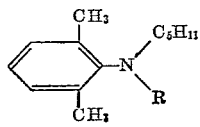

In this and succeeding formulas, R represents hydrogen or a pentyl radical. The novel compounds are colorless liquids somewhat soluble in many common organic solvents such as xylene and petroleum ether and of low solubility in water. They are useful as parasiticides and are adapted to be employed as the toxicants for the control of many insect, bacterial and fungi pests such as flies and *Alternaria solani*.

The new compounds are prepared by causing a reaction between 2,6-dimethylaniline and a pentyl halide such as pentyl chloride, bromide, or iodide, whereby one or two pentyl groups are substituted for amino-hydrogen in the 2,6-dimethylaniline. The reaction is carried out in an inert reaction medium such as water or isoamyl alcohol and in the presence of a neutralizing agent such as an alkali metal hydroxide, carbonate, or bicarbonate. The reaction takes place smoothly in the temperature range of 80° to 150° C., with the production of the desired product and hydrogen halide of reaction. This hydrogen halide appears in the reaction mixture as product of reaction with the employed neutralizing agent; for example, as an alkali metal halide. Good results are obtained when reacting one molecular proportion of 2,6-dimethyl aniline with one or at least two molecular proportions of pentyl halide, depending upon whether it is desired to obtain the monopentyl compound or the dipentyl compound respectively as a major product of reaction. In either case the reaction is carried out in the presence of an amount of neutralizing agent sufficient to neutralize the hydrogen halide of reaction. Because the amount of hydrogen halide produced is equimolecular with the reacted pentyl halide, the amount of neutralizing agent should be at least approximately stoichiometric with the halogen in the pentyl halide. Thus, if the neutralizing agent is potassium hydroxide, at least an amount equimolecular with reacted pentyl halide should be employed.

In carrying out the reaction, the pentyl halide, 2,6-dimethylaniline, and the neutralizing agent are intimately mixed and blended together in the reaction medium and the resulting reaction mixture thereafter heated to and maintained at the reacting temperature, with stirring, for a period of time to complete the reaction. Thereafter, the reaction mixture may be fractionally distilled under reduced pressure to obtain the desired N-pentyl-2,6-xylidine.

The following examples illustrate the invention but are not to be considered as limiting:

Example 1.—N,N-diisopentyl-2,6-xylidine

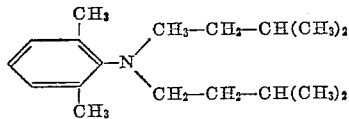

2,6-dimethylaniline (243 grams; 2 gram-moles), 900 grams (6 moles) isoamyl bromide and 240 grams (about 2.3 moles) of sodium carbonate were dispersed together with stirring in 450 grams of water as reaction medium. The resulting reaction mixture was heated at the boiling temperature, with stirring, for 216 hours to carry the reaction to completion. The reaction mixture was then cooled, whereupon it divided into an aqueous by-product layer and an organic product layer. The latter was separated and fractionally distilled under reduced pressure to obtain an N,N-diisopentyl-2,6-xylidine product as a colorless liquid boiling from 104°–110° C. under a pressure of 0.25 to 0.3 millimeter.

Example 2.—N-isopentyl-2,6-xylidine

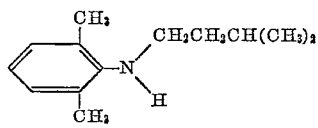

Isoamyl chloride (213 grams; 2 moles), 2,6-dimethylaniline (243 grams; 2 moles) and 240 grams (about 2.3 moles) of sodium carbonate are dispersed with stirring in 450 grams of water as reaction medium. The resulting reaction mixture is heated at the boiling temperature, approximately 100° C., with stirring, for about 100 hours to insure completion of the reaction. Thereafter the reaction mixture is processed as described in Example 1 to obtain an N-isopentyl-2,6-xylidine product as a colorless liquid. N-isopentyl-2,6-xylidine boils at 76°–79° C. under a pressure of 0.5 to 0.6 millimeter.

Example 3.—N-n-pentyl-2,6-xylidine

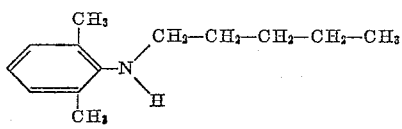

Normal amyl bromide (441 grams; 2.9 moles), 122 grams (1 mole) of 2,6-dimethylaniline and 128 grams (about 1 mole) of sodium carbonate were dispersed in 431 grams of amyl alcohol with stirring. The resulting reaction mixture was heated at 116° C. with continued stirring for 120 hours, to ensure completion of the reaction. Thereafter, sodium bromide by-product was removed by filtration, and the filtrate fractionally distilled under reduced pressure. As a result of these operations, there was obtained an N-pentyl-2,6-xylidine product as a colorless liquid boiling at 76° C. under a pressure of 0.07 millimeter.

In similar procedures other N-substituted 2,6-xylidines are prepared, such as an N,N-di-n-pentyl-2,6-xylidine, by reacting together n-pentyl iodide and 2,6-dimethylaniline, in the presence of potassium hydroxide.

The present compounds are useful as parasiticides. For such use, the unmodified compounds, or mixtures thereof such as dispersions on inert finely divided solids may be employed as additives for the feed of domestic animals; or enclosed in a capsule or compressed into a bolus as an oral medicament.

They are also useful as herbicides especially adapted to be used to control aquatic vegetation such as moneywort and Anacharis, and as insecticides. For such uses, the compounds may be dispersed on an inert finely divided solid and the resulting preparation employed as a dust. Also, such preparations may be dispersed in water with or without the aid of a wetting agent and the resulting aqueous suspensions employed as sprays or drenches. In other procedures, the compounds may be employed in oil, or as a constituent of oil-in-water or water-in-oil emulsions, or as aqueous dispersions thereof which may be applied as a spray, drench, or wash. In a representative operation, the wetting of a population of houseflies with an aqueous dispersion containing 2 pounds of N-pentyl-2,6-xylidine per 100 gallons of ultimate composition caused 100 percent mortality of the flies.

I claim:
1. A compound corresponding to the formula

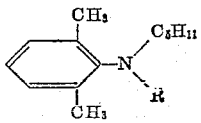

wherein R represents a member of the group consisting of hydrogen and an alkyl radical containing 5 carbon atoms.
2. N-isopentyl-2,6-xylidine.
3. N,N-diisopentyl-2,6-xylidine.
4. N-n-pentyl-2,6-xylidine.
5. N,N-di-n-pentyl-2,6-xylidine.

References Cited in the file of this patent

UNITED STATES PATENTS

| | | |
|---|---|---|
| 1,923,697 | Alt | Aug. 22, 1933 |
| 1,981,516 | Kyrides | Nov. 20, 1934 |
| 2,045,574 | Adkins et al. | June 30, 1936 |
| 2,831,894 | Stroh et al. | Apr. 22, 1958 |

OTHER REFERENCES

Beilstein's Handbuch der Organischen Chemie, vol. 12, page 1109. System No. (1704), Main Work, 1929 edition, 4th series.

Reilly et al.: Journal of the Society of the Chemical Industry, vol. 46, page 227T (1927).

Klevens: Journal of the American Chemical Society, vol. 71, page 1715 (1949).